(12) United States Patent
Yamada

(10) Patent No.: US 7,903,126 B2
(45) Date of Patent: Mar. 8, 2011

(54) IMAGE PROCESSING APPARATUS AND IMAGE PROCESSING METHOD THEREOF

(75) Inventor: Masahiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/617,495

(22) Filed: Nov. 12, 2009

(65) Prior Publication Data

US 2010/0231611 A1  Sep. 16, 2010

(30) Foreign Application Priority Data

Mar. 10, 2009 (JP) ................... 2009-056904

(51) Int. Cl.
G06T 3/40 (2006.01)
(52) U.S. Cl. .................... 345/671; 345/611
(58) Field of Classification Search .......... 345/611, 345/639, 671, 698; 348/458; 358/1.2, 528, 358/451; 382/299
See application file for complete search history.

(56) References Cited

U.S. PATENT DOCUMENTS
7,324,742 B2  1/2008 Miyazaki
2008/0068402 A1  3/2008 Ioka et al.

FOREIGN PATENT DOCUMENTS

| JP | 11-112940 A | 4/1999 |
|---|---|---|
| JP | 2003-9094 A | 1/2003 |
| JP | 2006-245677 | 9/2006 |
| JP | 2007-310837 A | 11/2007 |
| JP | 2008-85614 A | 4/2008 |
| JP | 2008-96956 A | 4/2008 |
| JP | 2008-131244 A | 6/2008 |

OTHER PUBLICATIONS

Japanese Office Action dated Mar. 9, 2010, Japanese Patent Application No. 2009-056904.
Japanese Decision to Grant a Patent dated Jun. 1, 2010, Japanese Patent Application No. 2009-056904.

Primary Examiner — Jeffery A Brier
(74) Attorney, Agent, or Firm — Patterson & Sheridan, LLP

(57) ABSTRACT

According to one embodiment, an image processing apparatus includes a first scaler, a second scaler, a generator, a coefficient assigner, and a blender. The first scaler converts the number of pixels of an image signal to scale up it according to control information set based on characteristic information. The second scaler converts the number of pixels of the image signal scaled up by the first scaler to further scale up it. The generator estimates an original pixel value from the image signal to increase the pixels, and generates an image signal with a resolution higher than that of the image signal scaled up by the first scaler. The coefficient assigner assigns a coefficient to the image signal generated by the generator according to the characteristic information or the control information. The blender blends the image signal generated by the generator with the image signal scaled up by the second scaler.

6 Claims, 3 Drawing Sheets

IMAGE PROCESSING APPARATUS AND IMAGE PROCESSING METHOD THEREOF

CROSS-REFERENCE TO RELATED APPLICATIONS

This application is based upon and claims the benefit of priority from Japanese Patent Application No. 2009-056904, filed Mar. 10, 2009, the entire contents of which are incorporated herein by reference.

BACKGROUND

1. Field

One embodiment of the invention relates to an image processing apparatus and an image processing method thereof.

2. Description of the Related Art

There has been proposed a super resolution technology as one of image processing technologies. The super resolution technology refers to a technology for increasing the resolution of low resolution moving video so that the video is clearly displayed even on a wide screen. More specifically, this technology increases the resolution of standard definition (SD) moving video such as digital versatile disk (DVD) video and analog video to video of high definition (HD) quality by pixel interpolation. The pixels to be interpolated are determined based on neighboring pixels. For example, Japanese Patent Application Publication (KOKAI) No. 2007-310837 discloses a conventional super resolution technology.

In recent years, the "super high vision system" has been developed that realizes video having information 16 times as much as that of HD video. With the conventional super resolution technology mentioned above, the same super resolution conversion is performed on an input video signal regardless of the format thereof and then the moving video is displayed. Therefore, when the resolution of a video signal with a small number of pixels such as SD (720×480 pixels) is converted to 4× full HD (3840×2160 pixels), 4K super HD (3840×2160 pixels), or the like by the super resolution conversion, a pixel originally not to be generated is interpolated. This results in enhancement of noise components contained in the input video signal.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an image processing apparatus comprises a first scaler, a second scaler, a generator, a weight assigner, and a blender. The first scaler is configured to convert the number of pixels of an input image signal to a first pixel number to scale up the image signal according to control information set based on characteristic information indicating the characteristics of the image signal to control the conversion of the number of pixels of the image signal. The second scaler is configured to convert the number of pixels of the image signal scaled up by the first scaler to a second pixel number larger than the first pixel number to further scale up the image signal. The generator is configured to perform super resolution conversion in which an original pixel value is estimated from the image signal scaled up by the first scaler to increase the pixels so as to generate an image signal with a resolution higher than the resolution of the image signal scaled up by the first scaler. The weight assigner is configured to assign weight to the image signal generated by the generator according to either the characteristic information or the control information. The blender is configured to blend the image signal generated by the generator with the image signal scaled up by the second scaler in accordance with the weight assigned to the image signal generated by the generator.

According to still another embodiment of the invention, there is provided an image processing method executed by an image processing apparatus comprising a controller and a storage module. The image processing method comprises: converting, by a first scaler, the number of pixels of an input image signal to a first pixel number to scale up the image signal according to control information set based on characteristic information indicating the characteristics of the image signal to control the conversion of the number of pixels of the image signal; converting, by a second scaler, the number of pixels of the image signal scaled up by the first scaler to a second pixel number larger than the first pixel number to further scale up the image signal; performing, by a generator, super resolution conversion in which an original pixel value is estimated from the image signal scaled up by the first scaler to increase the pixels so as to generate an image signal with a resolution higher than the resolution of the image signal scaled up by the first scaler; assigning, by a weight assigner, weight to the image signal generated by the generator according to either the characteristic information or the control information; and blending, by a blender, the image signal generated by the generator with the image signal scaled up by the second scaler in accordance with the weight assigned to the image signal generated by the generator.

Figure 1:
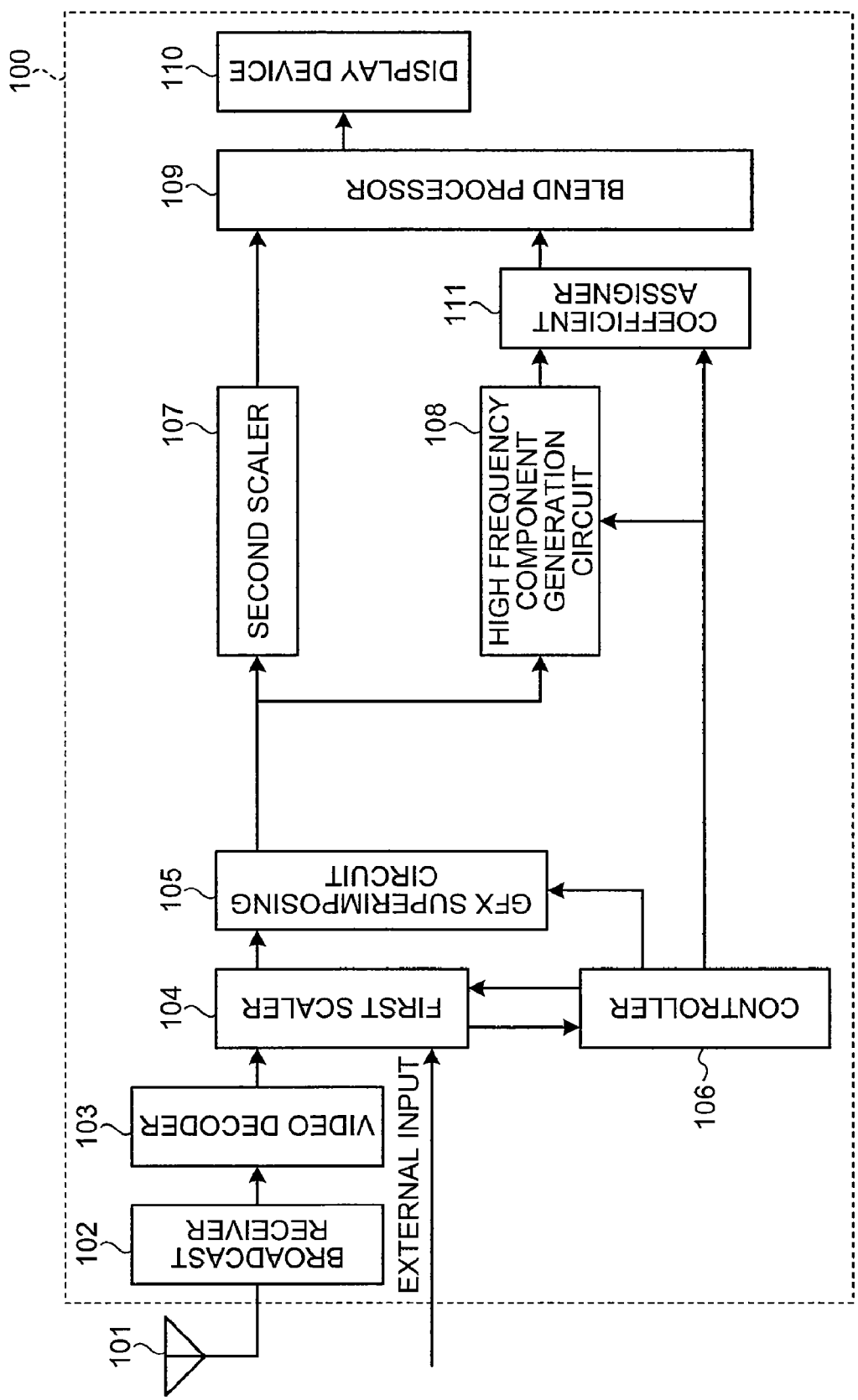
FIG. 1 is an exemplary block diagram of an image processing apparatus according to a first embodiment of the invention.

FIG. 1 is a block diagram of an image processing apparatus 100 according to a first embodiment of the invention. As illustrated in FIG. 1, the image processing apparatus 100 comprises an antenna 101, a broadcast receiver 102, a video decoder 103, a first scaler 104, a graphics (GFX) superimposing circuit 105, a controller 106, a second scaler 107, a high frequency component generation circuit 108, a coefficient assigner 111, a blend processor 109, and a display device 110.

The broadcast receiver 102 selects a broadcast signal of a desired channel from broadcast signals received by the antenna 101, and demodulates the broadcast signal of the selected channel. The broadcast receiver 102 then outputs the demodulated broadcast signal to the video decoder 103.

The video decoder 103 decodes an image signal encoded according to a compression standard such as moving picture experts group (MPEG) standard from the broadcast signal output from the broadcast receiver 102. The video decoder 103 then outputs the decoded image signal to the first scaler 104.

The first scaler 104 converts the number of pixels of the image signal output from the video decoder 103 to a constant pixel number. i.e., first pixel number, (for example, 1920×1080 pixels) to scale up the image signal according to control information, which will be described later, set by the controller 106 to control the conversion of the number of pixels of the image signal output from the video decoder 103. The first scaler 104 then outputs the scaled image signal to the GFX superimposing circuit 105. While, in the first embodiment, the number of pixels of an image signal output from the video decoder 103 is described as being converted to the first pixel number, this is by way of example and not of limitation. The number of pixels of an image signal input through an external input terminal (not illustrated) may be similarly converted to the first pixel number.

Besides, the first scaler 104 detects characteristic information indicating the characteristics of the image signal output from the video decoder 103. The characteristic information may be, for example, information on the distribution of signal levels such as the number of pixels, the amount of noise, the distribution of signal bands, brightness, color density, and the like. The first scaler 104 outputs the detected characteristic information to the controller 106.

The controller 106 controls the constituent elements of the image processing apparatus 100. An image signal output from the video decoder 103 may be of 720×480 pixels, 1440×1080 pixels, 1920×1080 pixels, or the like. For this reason, the controller 106 sets control information (for example, scale factor) to the first scaler 104 to control the conversion of the number of pixels of an image signal output from the video decoder 103 based on characteristic information on the image signal.

The controller 106 obtains characteristic information on an image signal detected by the first scaler 104 or control information set to the first scaler 104. The controller 106 then outputs the characteristic information or the control information to the high frequency component generation circuit 108 and the coefficient assigner 111, which will be described later. While, in the first embodiment, the controller 106 is described as obtaining characteristic information detected by the first scaler 104 or control information set to the first scaler 104, this is by way of example and not of limitation. For example, the controller 106 may obtain the characteristic information or the control information through the external input terminal (not illustrated).

Further, the controller 106 reads program information from an image signal output from the video decoder 103, and draws on-screen graphics data such as an electronic program guide (EPG). The controller 106 then outputs the on-screen graphics data to the GFX superimposing circuit 105.

The GFX superimposing circuit 105 superimposes the on-screen graphics data drawn by the controller 106 on an image signal scaled up by the first scaler 104. Examples of the on-screen graphics data include EPG including program information, channel information, etc., sound volume indicator, and the like. The GFX superimposing circuit 105 then outputs the image signal, on which the on-screen graphics data is superimposed, to the second scaler 107 and the high frequency component generation circuit 108.

The GFX superimposing circuit 105 displays a clear on-screen image even if the video decoder 103 outputs an image signal with a low resolution of, for example, 720×480 pixels. Therefore, the GFX superimposing circuit 105 superimposes on-screen graphics data on an image signal output from the video decoder 103 preferably after the first scaler 104 scales up the image signal. For this reason, in the first embodiment, the GFX superimposing circuit 105 is arranged at the latter stage of the first scaler 104.

The second scaler 107 converts the number of pixels of the image signal output from the GFX superimposing circuit 105 to a second pixel number larger than the first pixel number to further scale up the image signal. The second pixel number corresponds to the number of pixels of an image displayable on the display device 110. The second scaler 107 then outputs the scaled image signal to the blend processor 109. For example, if the GFX superimposing circuit 105 outputs an image signal of 1920×1080 pixels and the display device 110 is capable of displaying an image of up to 3840×2160 pixels, the second scaler 107 increases, both vertically and horizontally, the number of pixels of the image signal output from the GFX superimposing circuit 105 to twice the original value.

The high frequency component generation circuit 108 performs image processing (hereinafter, "super resolution conversion (sharpening)") on an image signal output from the GFX superimposing circuit 105 to increase the resolution thereof. In other words, the high frequency component generation circuit 108 generates an image signal with a resolution higher than the resolution of an image signal output from the GFX superimposing circuit 105 (an image signal having a high frequency component), which realizes a fine image that cannot be realized by the image signal (for example, with a resolution of 1920×1080 pixels) output from the GFX superimposing circuit 105.

The term "super resolution conversion" as used herein refers to sharpening process, in which, from an image signal with a low or intermediate resolution, an original pixel value is estimated to increase the pixels and thus to restore a high resolution and sharpened image signal having a high frequency component.

The term "original pixel value" as used herein refers to the value of each pixel of an image signal obtained by, for example, photographing the same object as that of an image with a low resolution by using a camera having high resolution pixels and capable of capturing an image with a high resolution.

Besides, "original pixel value is estimated to increase the pixels" means to obtain the characteristics of images to find correlated images or pixels, and estimate an original pixel value from neighboring images (in the same frame or between frames) based on the correlation to increase the pixels.

The super resolution conversion may be performed using known or commonly used technologies as disclosed in, for example, Japanese Patent Application Publication (KOKAI) Nos. 2007-310837, 2008-98803, and 2007-272334. In the first embodiment, the super resolution conversion uses a technology of, for example, restoring an image signal with a frequency component above the Nyquist frequency determined by the sampling rate of an input image signal.

If employing the super resolution conversion disclosed in Japanese Patent Application Publication (KOKAI) No. 2007-310837, the high frequency component generation circuit 108 sets a target pixel in each of a plurality of intermediate resolution frames, and sets a target image area so that it contains the target pixel. The high frequency component generation circuit 108 selects a plurality of correspondent points that correspond to a plurality of target image areas closest to a variation pattern of the pixel value in the target image area from a reference frame. The high frequency component generation circuit 108 sets a sample value of luminance of a correspondent point to the pixel value of a corresponding target pixel. The high frequency component generation circuit 108 calculates a pixel value for a high resolution frame having more pixels than the reference frame and corresponding to the reference frame based on the size of a plurality of sample values and layout of the correspondent points. Thus, the high frequency component generation circuit 108 estimates an original pixel value from an intermediate resolution frame, and increases the pixels to restore a high resolution frame.

If employing the super resolution conversion using self-congruency position search in the same frame image disclosed in Japanese Patent Application Publication (KOKAI) No. 2008-98803, the high frequency component generation circuit 108 calculates a first pixel position with the smallest error, i.e., a first error, by comparing errors of respective pixels in a search area of an intermediate resolution frame. The high frequency component generation circuit 108 calculates a position with the smallest error in the search area with decimal precision based on the first pixel position and the first error, and a second pixel position around a first pixel and a second error thereof. The high frequency component generation circuit 108 calculates a decimal-precision vector that has its end point at the position with the smallest error and its start point at a pixel of interest. The high frequency component generation circuit 108 calculates an extrapolation vector of the decimal-precision vector that has its end point at a pixel on a screen which is not in the search area based on the decimal-precision vector. The high frequency component generation circuit 108 calculates a pixel value for a high resolution image having more pixels than image data based on a pixel value obtained from the image data, the decimal-precision vector, and the extrapolation vector. In this manner, the high frequency component generation circuit 108 estimates an original pixel value from an intermediate resolution frame, and increases the pixels to restore a high resolution frame.

The high frequency component generation circuit 108 may employ the super resolution conversion disclosed in Japanese Patent Application Publication (KOKAI) No. 2007-272334, which improves image quality by optimizing the order of convex projection.

The above technologies of the super resolution conversion (sharpening) are cited by way of example and not by way of limitation. The high frequency component generation circuit 108 may employ various other technologies in which an original pixel value is estimated from an image signal with a low or intermediate resolution to increase the pixels to thereby obtain a high resolution image signal.

The coefficient assigner 111 assigns a coefficient (parameter) to an image signal generated by the high frequency component generation circuit 108 according to characteristic information or control information output from the controller 106. In this manner, the coefficient assigner 111 assigns a weight to the image signal generated by the high frequency component generation circuit 108.

For example, when the characteristic information output from the controller 106 indicates the small number of pixels (for example, 720×480 pixels), it is difficult for the high frequency component generation circuit 108 to generate an image signal having a high frequency component. As a result, the high frequency component generation circuit 108 emphasizes noise instead of generating an image signal having a high frequency component that is supposed to be generated. Accordingly, when the control information output from the controller 106 indicates a high scale factor (i.e., when the characteristic information output from the controller 106 indicates the small number of pixels), the coefficient assigner 111 assigns a small coefficient to an image signal generated by the high frequency component generation circuit 108. With this, the noise can be prevented from being emphasized due to the super resolution conversion.

On the other hand, when the characteristic information output from the controller 106 indicates a small amount of noise, the coefficient assigner 111 assigns a large coefficient to an image signal generated by the high frequency component generation circuit 108. In addition, when the characteristic information output from the controller 106 indicates high brightness, noise tends to be unnoticeable. Therefore, the coefficient assigner 111 assigns a large coefficient to an image signal generated by the high frequency component generation circuit 108.

The blend processor 109 blends an image signal generated by the high frequency component generation circuit 108 with an image signal output from the second scaler 107 according to a coefficient assigned by the coefficient assigner 111.

Figure 2:
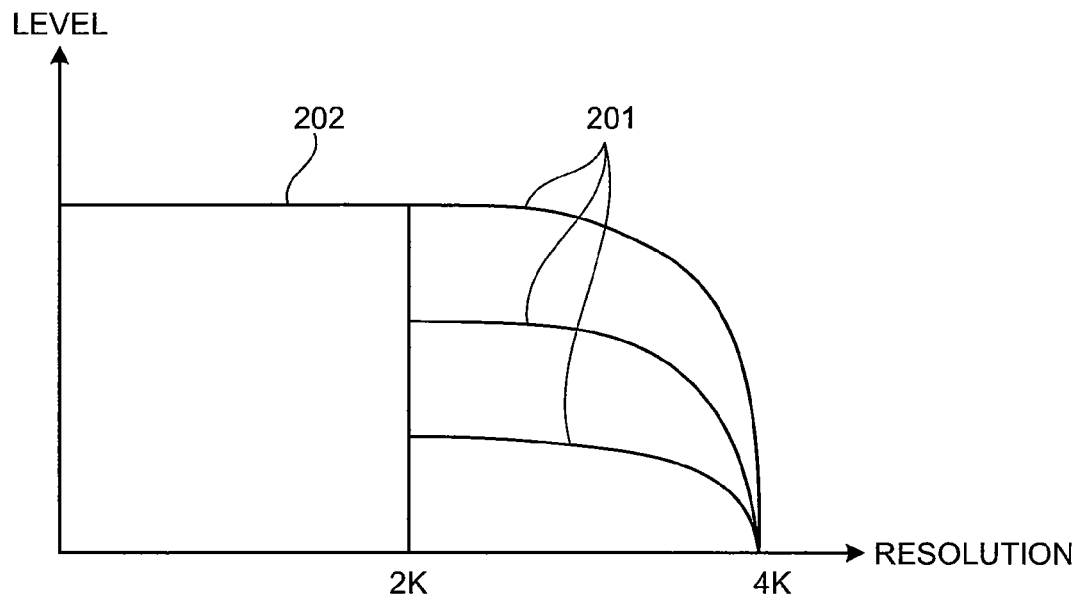
FIGS. 2 and 3 are exemplary graphs of the signal level of an image signal output from a blend processor in the first embodiment.

FIG. 2 is a graph of the signal level of an image signal output from the blend processor 109. In FIG. 2, a signal level 201 indicates the signal level of an image signal (with 4K resolution of 4096×2160 pixels) output from the blend processor 109. Meanwhile, a signal level 202 indicates the signal level of an image signal (with 2K resolution of 2048×1080 pixels) output from the GFX superimposing circuit 105. As illustrated in FIG. 2, the signal level of an image signal output from the blend processor 109 increases as a coefficient assigned by the coefficient assigner 111 becomes larger. On the other hand, the signal level of an image signal output from the blend processor 109 decreases as a coefficient assigned by the coefficient assigner 111 becomes smaller.

While, in the first embodiment, the coefficient assigner 111 assigns a coefficient to enable the super resolution conversion based on an appropriate parameter, this is by way of example and not of limitation. For example, the high frequency component generation circuit 108 may determine the distribution of pixels (parameter), of which an original pixel value is to be estimated from an image signal output from the GFX superimposing circuit 105, according to characteristic information or control information output from the controller 106. In this case, the high frequency component generation circuit 108 estimates an original pixel value from the image signal output from the GFX superimposing circuit 105 according to the distribution of pixels determined as above, and increases the pixels to generate an image signal having a high frequency component.

For example, when the characteristic information indicates the small number of pixels (for example, 720×480 pixels), the high frequency component generation circuit 108 lowers the distribution of pixels of which an original pixel value is to be estimated. The high frequency component generation circuit 108 may also determine the distribution of pixels of which an original pixel value is to be estimated such that an image signal is generated at a frequency band other than the frequency band of noise indicated by the characteristic information. Then, the blend processor 109 blends an image signal generated by the high frequency component generation circuit 108 with an image signal output from the second scaler 107.

Figure 3:
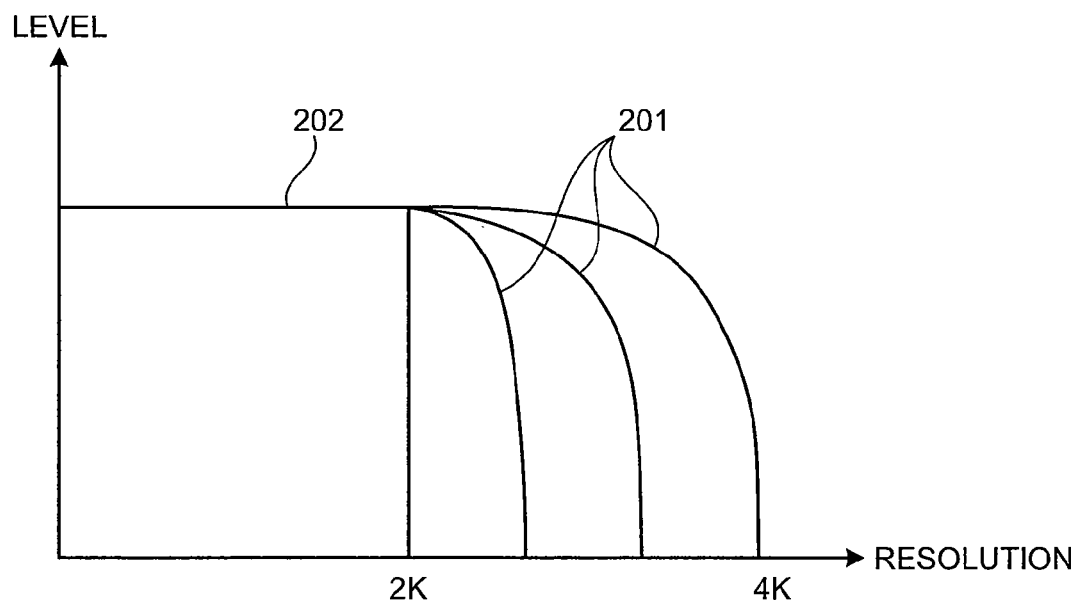

FIG. 3 is a graph of the signal level of an image signal output from the blend processor 109. As illustrated in FIG. 3, the resolution of an image signal output from the blend processor 109 increases when the distribution of pixels determined by the high frequency component generation circuit 108 rises. On the other hand, the resolution of an image signal output from the blend processor 109 decreases when the distribution of pixels determined by the high frequency component generation circuit 108 lowers.

According to the first embodiment, to enable the super resolution conversion based on an appropriate parameter, the coefficient assigner 111 assigns a coefficient to an image signal, or the high frequency component generation circuit 108 determines the distribution of pixels of which an original pixel value is to be estimated. However, it is not so limited. For example, to enable the super resolution conversion based on an appropriate parameter, the coefficient assigner 111 may assign a coefficient to an image signal, and also the high frequency component generation circuit 108 may determine the distribution of pixels of which an original pixel value is to be estimated.

The display device 110 may be, for example, a liquid crystal display (LCD). The display device 110 displays an image signal output from the second scaler 107 with which an image signal generated by the high frequency component generation circuit 108 is blended by the blend processor 109.

As described above, according to the first embodiment, the blend processor 109 blends an image signal generated by the high frequency component generation circuit 108 with an image signal output from the second scaler 107 according to a coefficient assigned by the coefficient assigner 111. Thus, an image signal having a high frequency component, which is supposed to be generated, can be generated while noise can be prevented from being emphasized. Therefore, even if input image signals have various resolutions, respectively, such as SD resolution (720×480 pixels) and HD resolution (1440× 1080 pixels), the image processing apparatus 100 can enable the super resolution conversion based on a parameter most suitable for each image signal.

Although the image processing apparatus 100 of the first embodiment is described above as having a design in which both the first scaler 104 and the second scaler 107 are housed in the same box, it is not so limited and the image processing apparatus may vary in the design. For example, the image processing apparatus may have a design in which the first scaler 104 and the second scaler 107 are housed in separate boxes, respectively. Such an image processing apparatus will be described in a second embodiment of the invention. In the following, constituent elements corresponding to those described in the first embodiment are designated by the same reference numerals, and their description will not be repeated.

Figure 4:
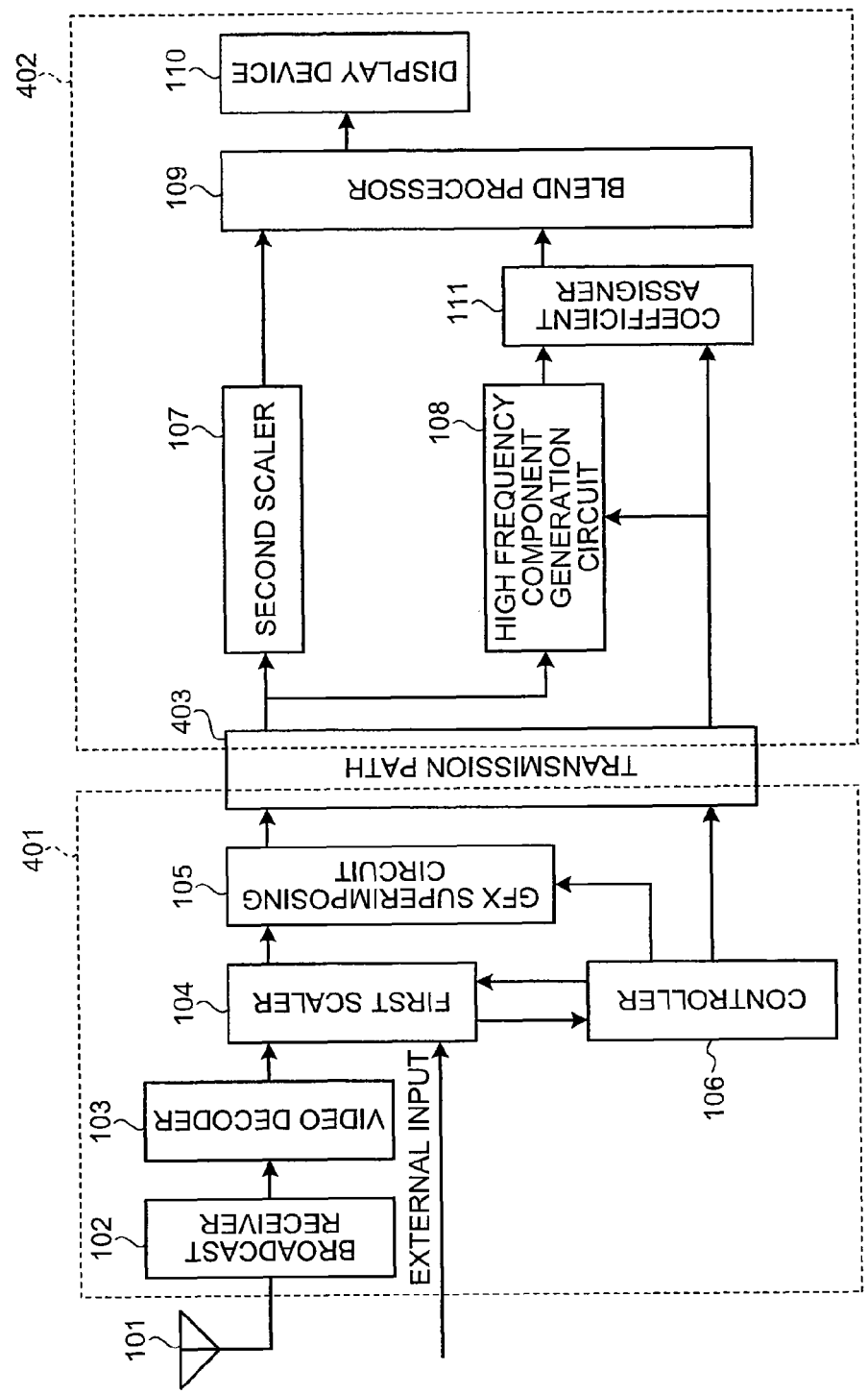
FIG. 4 is an exemplary block diagram of an image processing apparatus according to a second embodiment of the invention.

FIG. 4 is a block diagram of an image processing apparatus 400 according to the second embodiment. As illustrated in FIG. 4, the image processing apparatus 400 comprises the antenna 101, a receiver 401, a display 402, and a transmission path 403.

The receiver 401 converts the number of pixels of an image signal decoded from a broadcast signal received by the antenna 101 to the first pixel number, thereby scaling up the image signal. The display 402 converts the number of pixels of the image signal scaled up by the receiver 401 to the second pixel number, thereby further scaling up the image signal. The display 402 then displays the scaled image signal. The transmission path 403 is used to communicate an image signal scaled up by the receiver 401 and characteristic information or control information between the receiver 401 and the display 402.

The receiver 401 comprises the broadcast receiver 102, the video decoder 103, the first scaler 104, the GFX superimposing circuit 105, and the controller 106.

The transmission path 403 is a single cable defined by the high-definition multimedia interface (HDMI) standard. The transmission path 403 is used to transmit an image signal scaled up by the first scaler 104 from the GFX superimposing circuit 105 to the second scaler 107 and the high frequency component generation circuit 108. The transmission path 403 is also used to transmit characteristic information or control information from the controller 106 to the coefficient assigner 111.

In the case where the high frequency component generation circuit 108 determines the distribution of pixels of which an original pixel value is to be estimated, the transmission path 403, which is a single cable defined by the HDMI standard, is used to transmit characteristic information or control information from the controller 106 to the high frequency component generation circuit 108 as well as to transmit an image signal scaled up by the first scaler 104 from the GFX superimposing circuit 105 to the second scaler 107 and the high frequency component generation circuit 108.

While the transmission path 403, which is used to transmit an image signal and characteristic information (or control information), is described as a cable defined by the HDMI standard, the transmission path 403 is not limited to such a cable. The transmission path 403 may be, for example, a cable defined by the high-definition multimedia interface-consumer electronics control (HDMI-CEC) standard or an auxiliary (AUX) channel.

As described above, according to the second embodiment, even if the image processing apparatus 400 is of a design having a separate set of the receiver 401 and the display 402, the same effect as previously described in the first embodiment can be achieved.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
    a first scaler configured to convert number of pixels of an input image signal to a first pixel number to scale up the image signal according to control information set based on characteristic information indicating characteristics of the image signal to control conversion of the number of pixels of the image signal;
    a second scaler configured to convert the number of pixels of the image signal scaled up by the first scaler to a second pixel number larger than the first pixel number to further scale up the image signal;
    a generator configured to perform super resolution conversion in which an original pixel value is estimated from the image signal scaled up by the first scaler to increase pixels so as to generate an image signal with a resolution higher than resolution of the image signal scaled up by the first scaler;
    a weight assigner configured to assign weight to the image signal generated by the generator according to either the characteristic information or the control information; and
    a blender configured to blend the image signal generated by the generator with the image signal scaled up by the second scaler in accordance with the weight assigned to the image signal generated by the generator.

2. The image processing apparatus of claim 1, further comprising:

a first device comprising the first scaler and an obtaining module configured to obtain either the characteristic information or the control information;

a second device comprising the second scaler, the generator, the weight assigner, and the blender; and a transmission path configured to transmit the image signal scaled up by the first scaler from the first scaler to the second scaler and the generator, and to transmit either the characteristic information or the control information from the obtaining module to the weight assigner.

3. The image processing apparatus of claim 2, wherein the transmission path is a single cable configured to transmit the image signal scaled up by the first scaler, and either the characteristic information or the control information.

4. The image processing apparatus of claim 3, wherein the transmission path is a single cable configured to transmit the image signal scaled up by the first scaler, and either the characteristic information or the control information according to high-definition multimedia interface standard.

5. The image processing apparatus of claim 1, wherein the weight assigner is configured to assign the weight to the image signal generated by the generator in accordance with number of pixels of the input image signal representing the characteristic information.

6. An image processing method executed by an image processing apparatus comprising a controller and a storage module, the image processing method comprising:

converting, by a first scaler, number of pixels of an input image signal to a first pixel number to scale up the image signal according to control information set based on characteristic information indicating characteristics of the image signal to control conversion of the number of pixels of the image signal;

converting, by a second scaler, the number of pixels of the image signal scaled up by the first scaler to a second pixel number larger than the first pixel number to further scale up the image signal;

performing, by a generator, super resolution conversion in which an original pixel value is estimated from the image signal scaled up by the first scaler to increase pixels so as to generate an image signal with a resolution higher than resolution of the image signal scaled up by the first scaler;

assigning, by a weight assigner, weight to the image signal generated by the generator according to either the characteristic information or the control information; and blending, by a blender, the image signal generated by the generator with the image signal scaled up by the second scaler in accordance with the weight assigned to the image signal generated by the generator.

* * * * *